United States Patent [19]

Nicolas

[11] Patent Number: 4,688,428
[45] Date of Patent: Aug. 25, 1987

[54] METHOD OF AND DEVICE FOR SCANNING OBJECTS BY MEANS OF ULTRASOUND ECHOGRAPHY

[75] Inventor: Jean-Marie Nicolas, Paris, France

[73] Assignee: U.S. Philips Corporation, New York, N.Y.

[21] Appl. No.: 843,906

[22] Filed: Mar. 25, 1986

[30] Foreign Application Priority Data

Mar. 29, 1985 [FR] France ................. 85 04821

[51] Int. Cl.$^4$ ............................. G01N 29/04
[52] U.S. Cl. ...................................... 73/602
[58] Field of Search ............... 73/602, 627, 629, 628, 73/620; 128/660

[56] References Cited

U.S. PATENT DOCUMENTS

| | | | |
|---|---|---|---|
| 4,446,737 | 5/1984 | Hottier | 73/602 |
| 4,566,330 | 1/1986 | Fujii et al. | 73/602 |
| 4,576,046 | 3/1986 | Fink et al. | 73/602 |
| 4,594,662 | 6/1986 | Devaney | 73/602 |
| 4,598,366 | 7/1986 | Devaney | 73/602 |

*Primary Examiner*—Anthony V. Ciarlante
*Attorney, Agent, or Firm*—Jack E. Haken

[57] ABSTRACT

A method of scanning objects by means of ultrasound echography, including the repeated transmission of ultrasound signals by means of at least one ultrasound transducer and the reception of the ultrasound echoes which correspond to the principal obstacles encountered by the transmitted signals in their propagation direction, characterized in that the method includes the following operations:
(a) storing an echographic line in a memory;
(b) determining the power spectrum for a given observation depth, including the correction for the effects of diffraction and attenuation;
(c) storing in a memory and/or displaying the scatter function of the object examined as a function of frequency;
(d) repeating the operations (b), (c) for every desired depth on a given echographic line, and the operations (a), (b), (c) for other echographic lines.

4 Claims, 2 Drawing Figures

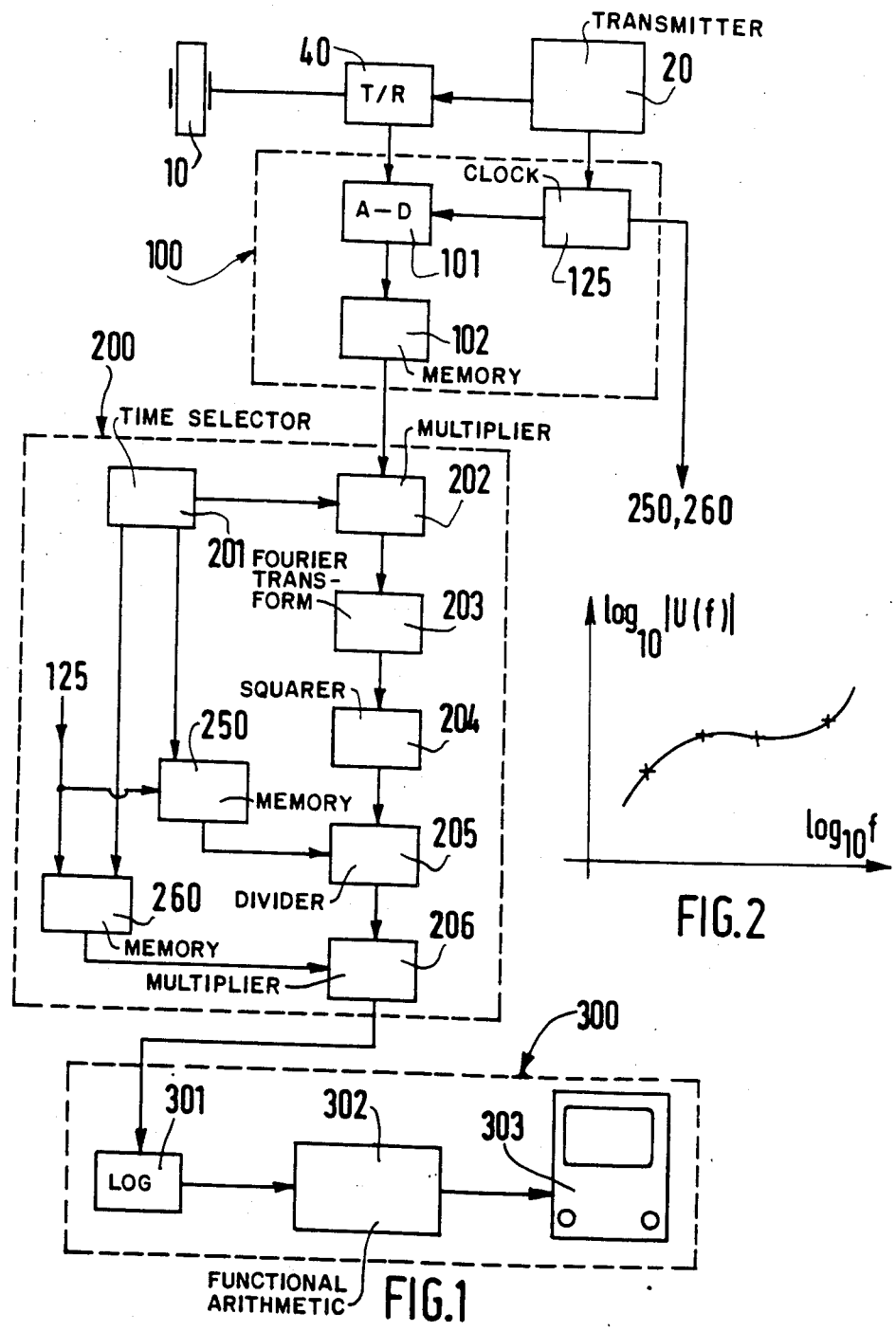

METHOD OF AND DEVICE FOR SCANNING OBJECTS BY MEANS OF ULTRASOUND ECHOGRAPHY

The invention relates to a method of scanning objects by means of ultrasound echography, involving the repeated transmission of ultrasound signals by means of at least one ultrasound transducer and the reception of the ultrasound echoes which correspond to the principal obstacles encountered by the transmitted signals in their propagation direction.

The invention also relates to a device for performing such a method, including at least one ultrasound transducer which is connected to a transmitter stage for the repeated transmission of ultrasound signals and to a receiver stage for receiving the ultrasound echoes which correspond to the principal obstacles encountered by the transmitted signals in their propagation direction.

A device of this kind can be used, for example for the non-destructive testing of materials and for the scanning of biological tissues.

A conventional ultrasound echogram is obtained by the detection of the envelope of the echoes which are produced in the tissues by means of an ultrasound beam. Because the most important echoes arise at the boundaries of the organs, these echograms show mainly the contours of these organs. All information concerning the phase, and hence the frequency, of the signal is then lost. This information can be associated with appropriate indicators of some indistinct diseases which are difficult to diagnose by means of other means.

In a paper having the title "Estimation of frequency dependent attenuation in biological tissue by time-frequency representation of the echographic A-lines" (IEEE 1983 Ultrasonic Symposium Proceedings, pp 835-840) J. L. Bernatets and F. Hottier propose a method for analysing an echographic signal by determining the power spectrum S(f) of that signal (f being the frequency). The mathematical expression of this power spectrum comprises the scatter function of the examined object. In view of the hypotheses made this model only permits one to know the behaviour of the attenuation as a function of the frequency.

It is an object of the invention to provide a method of examining objects by means of ultrasound echography which by means of a different hypotheses, enables determination of the frequency-dependency of another parameter that may be a good pathological indicator, to wit the scatter function of the object to be examined.

To achieve this, the method in accordance with the invention is characterized in that it includes the following operations:

(a) storing an echographic line in a memory;
(b) determining the power spectrum for a given observation depth, including correction for the effects of diffraction and attenuation;
(c) storing in a memory and/or displaying the scatter function of the object examined as a function of the frequency; ,P1 (d) repeating the operations (b), (c) for every desired depth on a given echographic line, and the operations (a), (b), (c) for other echographic lines.

Using this method, the scatter function of the object examined can be quantitatively determined so that the object can be characterized and the pathological condition thereof can be determined.

It is further object of the invention to provide a device for scanning objects by means of ultrasound echography which is capable of performing the method in accordance with the invention.

To achieve this, the device in accordance with the invention is characterized in that said receiver stage includes:

(A) a memory stage for the storage of an echographic line, said stage being composed of an analog-to-digital converter and a digital memory;
(B) a determination stage for determining power spectra, said stage being composed of successively a selection circuit for the selection of the observation depth, a multiplier circuit for multiplying the output signal of the selection circuit by the output signal of the memory stage for the storage of the echographic line, an arithmetic circuit for calculating the Fourier transform, an arithmetic circuit for calculating the square of the modulus, a correction stage for correcting the diffraction, and a correction stage for correcting the attenuation;
(C) a stage for storing in a memory and/or displaying the scatter function of the object examined, said stage consisting of a logarithmic amplifier for amplifying the output signal of the stage for determining the spectra, and an arithmetic circuit for storing the scatter function of the object scanned as a function of the frequency or for displaying it on a display device.

The invention will be described in detail herein after, by way of example, with reference to the accompanying drawings; therein:

FIG. 1 shows an embodiment of the device in accordance with the invention; and

FIG. 2 shows a curve representing the results of the operations performed by the arithmetic circuit of the device shown in FIG. 1.

The analysis of the frequency-dependency of the scatter function of the object examined is performed by comparison of mean power spectra. It is known that the formule for a mean power spectrum can be expressed as follows for a time slot W at the instant $\tau$:

$$S_w(\tau,f) = |G(f)|^2 \cdot |U(f)|^2 \cdot D(\tau,f) \cdot e^{-2\alpha(f)c\tau} \quad (1)$$

In the formule $|G(f)|^2$ depends only on the transmitted signal and on the acoustic and electrical properties of the transducer; $D(\tau,f)$ is the filter effect caused by the diffraction; $\alpha(f)$ and c denote the attenuation and the speed, respectively, of the ultrasound waves in the object examined; and U(f) represents the scatter function of the object. From formule (1) the following formule is derived:

$$|U(f)|^2 = S_w(\tau,f)/(|G(f)|^2 \cdot D(\tau,f) \cdot e^{-2\alpha(f)c\tau}) \quad (2)$$

The device in accordance with the invention enables determination of $|U(f)|^2$ and the frequency-dependency of the scatter function can subsequently be derived therefrom. The device shown in FIG. 1 in this case comprises a single probe wich forms a carrier for an ultrasound transducer 10 and which enables A-type echograms to be obtained objects such as biological tissues. It will be apparent that the invention can be used in exactly the same way when instead of a single line a complete flat slice of the tissues is scanned either by means of a manually displaceable probe or a probe involving so-called sectorial mechanical angular displacement which is connected to a radar-type display device, or by means of a linear array of p ultrasound transducers which define a corresponding number (p) of parallel scanning directions in the tissues to be examined, said array being connected to a switching circuit for successively switching over the echo processing device to each active transducer or group of transducers, or by means of an array of transducers with so-called sectorial electronic scanning, said array also being connected to a switching circuit for switching over the processing device and, moreover, to a network of delay lines or phase shifters.

The transducer 10 is connected on the one side to a transmitter stage 20 which ensures that the transducer can repeatedly transmit ultrasound signals in an arbitrary scanning direction through the tissues to be examined, and on the other side to a receiver stage which serves for the processing of the ultrasound echoes which are received by the transducer and which correspond to the principal obstacles encountered by the transmitted signals in their propagation direction. The situation of these obstacles can be defined in the echograms by the echoes of high amplitude which represent the boundaries between the tissues for which the difference factors for the ultrasound attenuation are to be determined. Said association is generally obtained by means of a T/R selection circuit 40 which ensures that either the transmitter stage or the receiver stage is exclusively connected to the transducer; a selection circuit of this kind is mentioned, for example in U.S. Pat. No. 4,139,834. The selection circuit 40 prevents the transmitted signals from being affected by the signals received and also prevents the signals received from being masked by the signals transmitted.

The receiver stage of the described embodiment includes a series connection of a memory circuit 100 for storing an echographic line (A-type) in a memory, a processing circuit 200 and a determination circuit 300 for determining the frequency dependency. The memory circuit 100 successively includes an analog-to-digital converter 101 which is controlled by a clock circuit 125 which itself is controlled by the clock of the transmitter stage, and a digital memory 102. The processing circuit 200 successively includes a time selection circuit 202, an arithmetic circuit 203 for calculating the Fourier transform, an arithmetic circuit 204 for calculating the square of the modulus in order to calculate the power spectrum, a correction circuit for the diffraction and a correction circuit for the attenuation. The time selection circuit 202 of the present embodiment is formed by a multiplier circuit for multiplying the output signal of the memory 102 by a squarewave signal which forms a time slot whose position is determined by a selection circuit 201 for selecting the transit time thus selected corresponding, for example to the leading edge of the squarewave signal. It is to be noted that the selection of the transit time is the same as the selection of the observation depth in the object examined.

The correction circuit for correcting the diffraction is formed by a dividing circuit 205, a first input of which receives the output signal of the arithmetic circuit 204 for calculating the square of the modulus, and a second input of which receives a dividing signal from the memory 250 for correcting the diffraction. The memory 250 is controlled by the clock circuit 125 which is activated by the clock of the transmitter stage, and is also connected to the output of the selection circuit 201 for selecting the transit time. The memory 250 is either a programmable read-only memory (PROM) or a random access memory (RAM) and is loaded as follows (regardless of whether the transducer is a focussing type or not). A slice of the object to be examined is selected, said slide being situated at the front of the object (with respect to the device) and at a distance Z on the main axis of propagation, the intermediate object present between this slice and the device being a medium having a low attenuation, for example, water. Using a constant transmitted signal, the energy spectrum of the echographic signal is determined in this position; subsequently, this operation is repeated at the same distance Z but for other positions, reached by displacements perpendicularly to the main axis of propagation, in order to obtain a mean energy spectrum, for example by determining a mean spectrum from 100 spectra around the same position. Subsequently, the mean energy spectrum is determined in the same manner for other distances Z between the device and the object to be examined, be it that always the same object slice is examined under the influence of a time-selection circuit which defines a time slot. Subsequently, for all successive positions along the axis Z the correction values for the diffraction are calculated (due to the appropriate choice of the intermediate object, the measurements performed eliminate any effect of the attenuation) and these values are written into the memory 250. In the case of a nonfocussing transducer, the correction values can also be determined without utilizing a slice of the object to be examined, that is to say simply by using, for example the flat or spherical reflective surface of a reference body.

The correction circuit for correcting the attenuattenuation is formed by a multiplier circuit 206, a first input of which receives the output signal of the multiplier circuit 205 and a second input of which receives a correction signal for correcting the attenuation for which the formule is written as $e^{+2\alpha(f)c\tau}$. The values of this correction signal for correcting the attenuation are supplied by a memory 260 which is controlled by the clock circuit 125 and also by the selection circuit 201 for selecting the transit time. As has already been stated, this memory is either a PROM-type read-only memory or a random access memory.

The output of the multiplier circuit 206 supplies a signal which is proportional to $|U(f)|^2$ and which is applied to the input of the circuit 300 for determining the frequency-dependency. Because it is assumed that the scatter function can be expressed in the polynominal form $U(f)=af^b$, the determination circuit 300 includes the following circuits: a logarithmic amplifier 301 which supplies a signal which is proportional to $2b \cdot \log_{10} f$, and a functional arithmetic circuit 302 whereby the frequency-dependency of the scatter function can be stored in a memory and/or displayed (see FIG. 2, in the logarithmic coordinate), display taking place on a display device 303.

These calculations are repeated for every desired depth, said observation depth thus being determined by the circuit 201 in steps which are smaller as a finer image or examination is required. Using a conventional mechanical or electronic scanning device or simple manual displacement, other echographic lines can subsequently be examined in a similar manner so that B-type images are obtained. In all cases a choice can be made between the storage and/or display as a function of the frequency for a given depth or the storage and/or display as a function of the depth for a given frequency.

What is claimed is:

1. A method of ultrasound echographic scanning which determines local values of the scatter coefficient in an object comprising the steps of:

repeatedly transmitting pulses of ultrasound energy into the object;

receiving echographic A-lines which correspond to principal obstacles encountered by the pulses as they propagate through the object;

storing an A-line in a memory;

(a) determining the power frequency spectrum of a portion of the A-line which corresponds to a selected volume within the object;

(b) correcting the power frequency spectrum for the effects of ultrasound diffraction; and (c) further correcting the power frequency spectrum for the effects of attenuation in the object;

whereby the corrected power spectrum characterizes the scatter coefficient in the selected volume of the object.

2. The method of claim 1 further comprising the steps of:

repeating the steps of determining the power frequency spectrum, correcting the power spectrum for the effects of diffraction, and correcting the power spectrum for the effects of attenuation for additional portions of the A-line selected.

3. The method of claim 2 further comprising the step of redirecting the pulses into the object; storing a different echographic A-line in the memory; and repeating steps (a)-(c) for said different A-line to determine the scatter coefficient at additional selected volumes.

4. A device for scanning an object by means of ultrasound echography to determine local values of the scatter coefficient therein comprising:

an ultrasound transducer;

transmitter means connected to the transducer which cause repeated transmission of ultrasound signals into the object;

receiver means connected to the transducer which receive ultrasound echoes which correspond to principal obstacles of propagation through the object, wherein the receiver means include (a) memory means which store signals which correspond to the echoes along an echographic A-line;

(b) power spectrum determination means connected to process the A-line signal from the memory which include, in cascade, selection means which select a portion of the A-line which corresponds to a selected observation depth in the object;

Fourier transformer means which calculate the Fourier transform of the selected portion of the A-line;

first arithmetic means connected to the output of the Fourier transformation means which calculate the square of the Fourier transform of the selected portion of the A-line;

first means which compensate the output of the first arithmetic means for the effects of ultrasonic diffraction in the object; and second means which compensate the output of the first means which compensate for the frequency dependent effects of ultrasonic attenuation in the object; and (c) means which receive the output of the second means which compensate, which display and/or store the scatter function in the object comprising, in cascade, logarithmic converter means and second arithmetic means which determine the scatter function in the selected region from a predetermined functional relationship of the scatter function as a function of frequency.

* * * * *